UNITED STATES PATENT OFFICE.

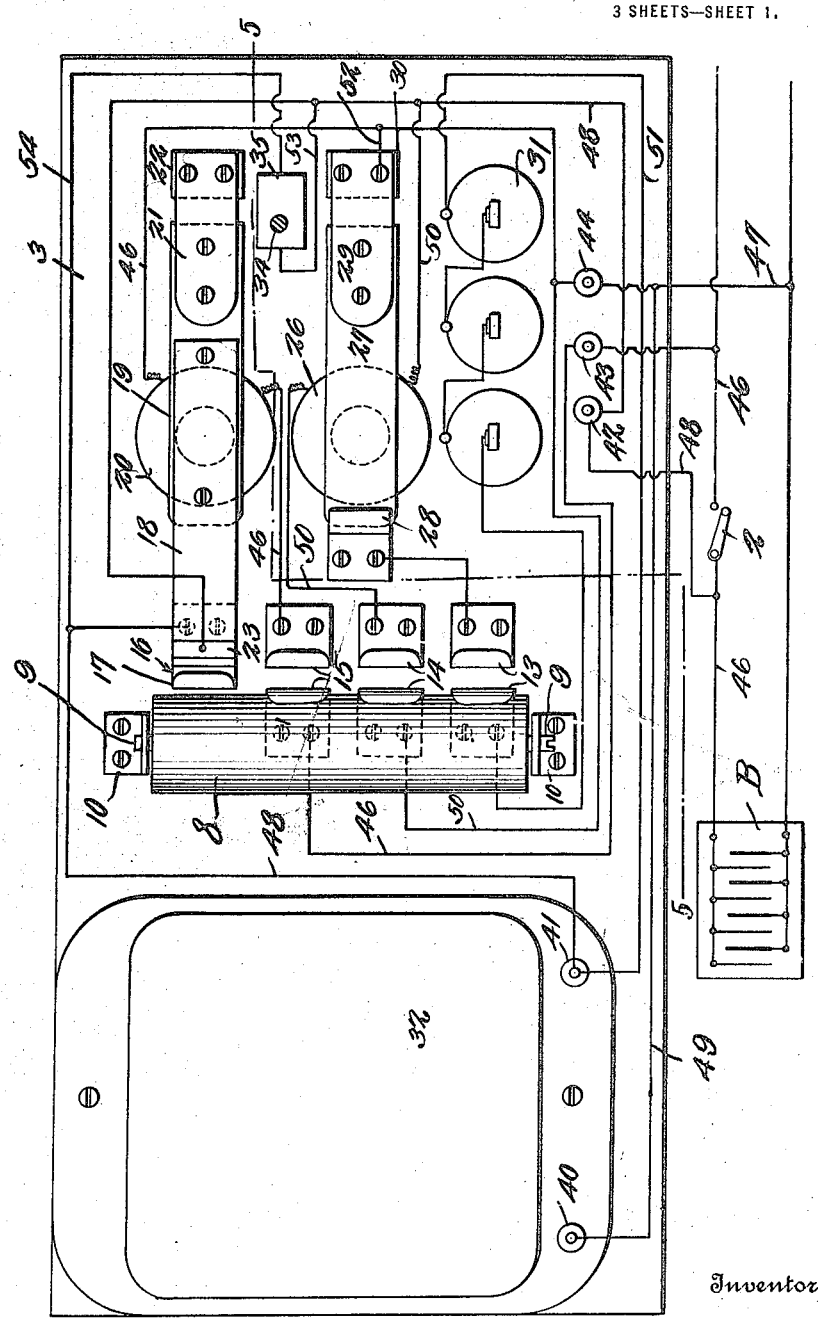

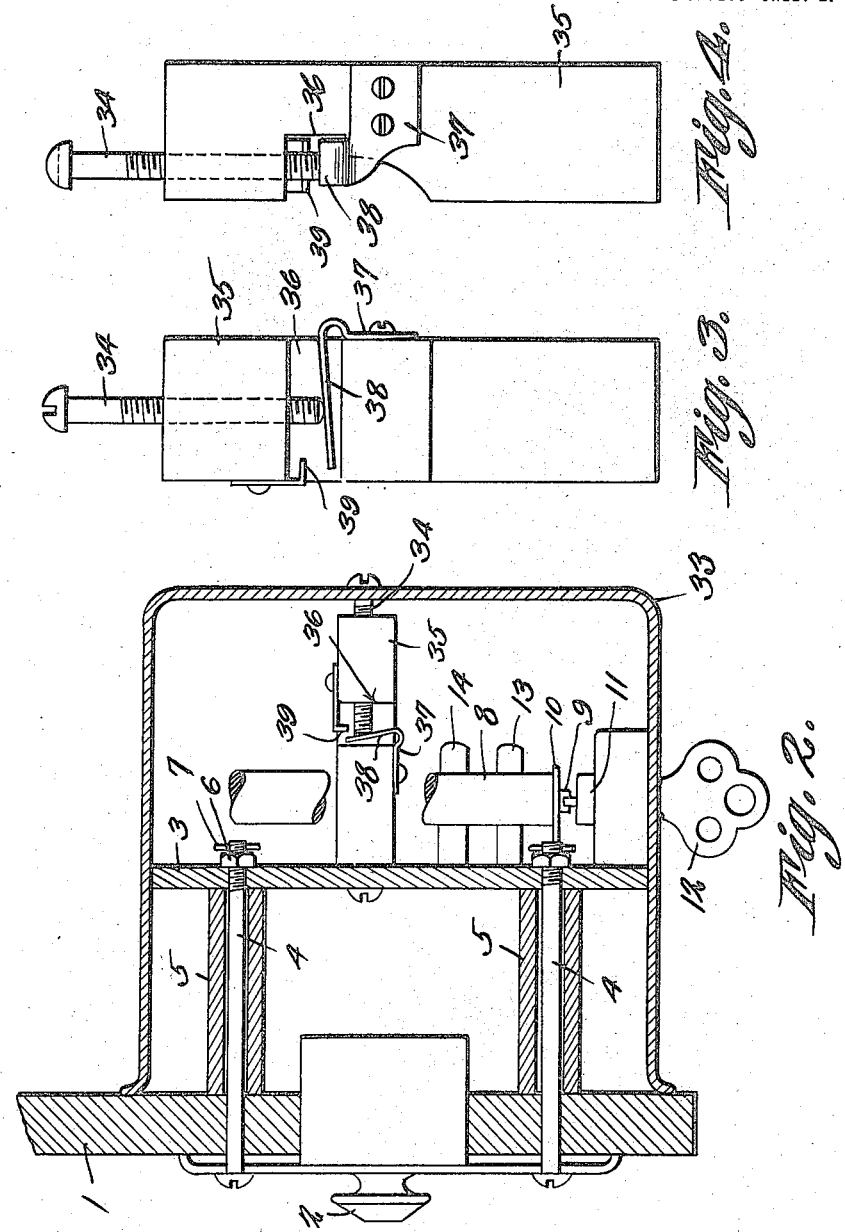

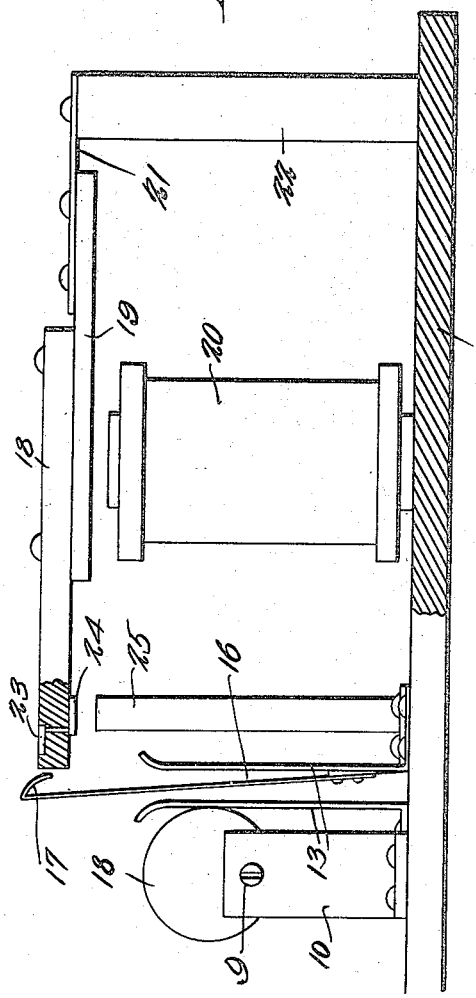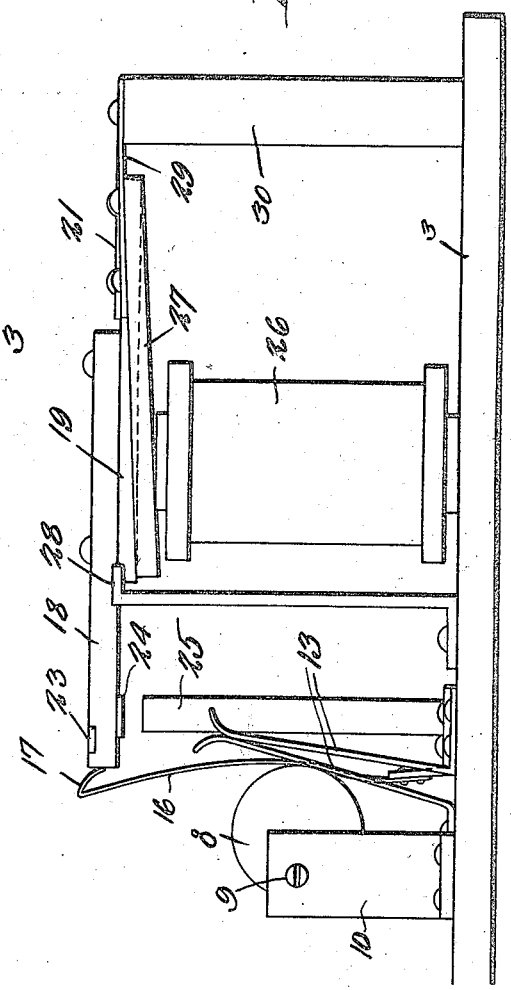

JOHN L. CROSSER, OF TULSA, OKLAHOMA.

AUTO THEFT ALARM.

1,424,993.   Specification of Letters Patent.   Patented Aug. 8, 1922.

Application filed May 8, 1920. Serial No. 379,929.

*To all whom it may concern:*

Be it known that I, JOHN L. CROSSER, a citizen of the United States, residing at Tulsa, in the county of Tulsa and State of Oklahoma, have invented a new and useful Auto Theft Alarm, of which the following is a specification.

This invention relates to devices for preventing theft or unauthorized use of an automobile and has for its object the provision of a simple inexpensive attachment that may be installed in the electrical system of a motor vehicle, either by the manufacturer, as a part of the system or later be attached by the owner of the car.

It is further the object of the invention to provide means whereby with the device in operative position an alarm will be sounded should a person close the ignition switch, or tamper with the device in an attempt to remove the cover therefrom, or should he cut the wires leading from the device to the storage battery, in either case the alarm will continue to sound until the rightful owner arrives and unlocks the device.

With these and other objects in view which will appear as the description proceeds, the invention resides in the novel combination and arrangement of parts hereinafter more particularly pointed out and claimed, it being understood that minor changes may be made within the scope of what is claimed without departing from the spirit or sacrificing any of the advantages of the invention.

In the drawing forming a part of this specification

Figure 1 is a diagrammatical rear elevation of the device;

Figure 2 is a transverse section through the instrument board of a motor vehicle showing the device attached thereto;

Figures 3 and 4 are detail views of the cover securing means;

Figure 5 is a view of the device partly in section and partly in elevation the same being taken on line 5—5 of Figure 1.

Figure 6 is a side elevation of the device in locked position, there being parts broken away.

Referring to the drawing by characters of reference the numeral 1 designates the instrument board of a motor vehicle, the board being provided with the usual equipment to be found on the modern automobile, the ignition switch being designated by the numeral 2. A plate 3 of non-conducting material is attached to the board 1 on the rear side thereof by means of bolts 4 and spacing sleeves 5, nuts 6 are threaded on the bolts 4 and a cotter pin 7 prevents the removal of the nut.

A barrel 8 of non-conducting material is eccentrically mounted on bearing pins 9, supported in brackets or standards 10. One of the pins 9 is connected to a multi-tumbler lock mechanism 11, so that the member 8 may be given a partial rotation by means of a key 12.

Pairs of normally spaced spring contact members 13, 14 and 15 are secured to the plate 3 and are moved to contacting position when the barrel 8 is rotated with the large side thereof toward the said spring members, as shown in Figure 6. A spring arm 16 is secured to the base 3 and is provided with a hook 17 at its free end. When the device is set as shown in Figure 6 the hook rests against the end of a bar 18 of non-conductive material which is secured to the armature 19 of an electromagnet 20. The armature 19 is supported by a spring plate 21 secured to a post 22 of nonconducting materal. When the magnet 20 is energized and attracts the armature 19 the hook 17 snaps over the top of the bar 18.

A plate 23 secured to the top of the bar 18 is electrically connected as shown in Figure 5, to a plate 24 located on the under side of the bar 18, the plate 24 being adapted to contact with a member 25 when the armature 19 is attracted by the magnet 20 remaining in contact therewith so long as the magnet 20 is energized. The member 25 is connected to the base of the spring arm 16 for a purpose that will presently appear. The bar being released from engagement of the hook 17 when the owner inserts his key in the lock and rotates the barrel to normal open position.

A second electro magnet 26 is mounted on the plate 3 and is adapted when energized, to attract an armature 27, the free end of the armature being normally in engagement with a contact member 28, the opposite end of the armature 27 is resiliently mounted, by means of a spring plate 29, to a post 30 located on the plate 3.

A battery 31 or other source of electrical energy is located on the plate 3 and an alarm 32 is also carried by the plate, the various parts being electrically connected as will presently appear.

A cover or housing 33 surrounds the plate 3 and encloses the parts mounted thereon, the sides of the cover extending to the back of the instrument board 1 as clearly shown. The cover is attached to the plate 3 by a screw 34 threaded into a post 35 which is secured to the plate 3. The post 35 is provided intermediate its ends with a notch 36. A plate 37 secured to the side of the post has a spring blade 38 extending across the notch 36 and is engaged by the end of the screw 34 when the same is driven to hold the cover 33 in place. In this position contact between the blade 38 and a second plate 39 is broken, remaining so until the screw 34 is partially removed from the post 35, in which case, with the barrel 8 in operative position, a circuit will be established through the blade 38 and plate 39 and an alarm sounded as will presently appear. Binding posts 40 and 41 are provided for the terminals of the electrical connections leading to the alarm 32. Other binding posts 42, 43 and 44 are provided for connecting to the storage battery of the car and for the conductors to the several parts of the device.

The operation of the device is as follows:—

Suppose that the owner has locked the car leaving the parts in the position shown in Figure 6 and that an unauthorized person attempts to start the car by closing the ignition switch 2. A circuit will be established from one side of the storage battery B, through a conductor 46 binding post 43, contacts 15 magnet 20 back to the other side of the battery through the binding post 44 and conductor 47, thus energizing the magnet 20 which attracts the armature 19, permitting the hook 17 to snap over the top of the bar 18. An electrical circuit will then be set up from one side of the battery through the conductor 48, post 42, plates 23, and 24 and member 25 to the post 41, through the alarm, conductors 49 and 47 back to the battery, thus sounding the alarm. It will be observed that should the ignition switch be turned off at this time the magnet 20 will be de-energized and the bar 18 will move back to cause the hook 17 to engage the plate 23 and the alarm circuit will continue as previously described, but through the hook 17 and arm 16 instead of the plate 24 and post 25 and the alarm will continue to sound until the owner arrives and turns the barrel 8 to normal open position, the hook 17 will then free the bar 18 and the alarm circuit will be broken.

The wires 47 and 48, extending from the battery B to the casing 33 may be placed so as to be visible and thus serve as a "bait" for a would be thief, who thinking to cut the wires might prevent an alarm, in which case, a circuit established when the device is locked and including the battery B, conductor 48, a branch 50, the magnet 26 energizing the same and attracting the armature 27, thence through the contacts 14, post 44 and conductor 47 back to the battery, is broken and the armature 27 springs back into contact with the hook 28 which establishes a circuit through the dry cells 31, conductor 51, alarm 32 conductors 49 and 47, wire 46, a branch 52 the plate 29, armature 27, contact 28, plates 13 to the battery 31, thus giving an alarm should either or both of the wires 47 or 48 be tampered with.

Should an attempt be made to remove the cover 33 by retracting the screw 34, contact will be made between the plates 38 and 39 and an alarm sounded by including battery B in a circuit through the post 42 conductor 48, a branch 53, contact plates 38 and 39, a conductor 54, alarm 32, conductors 49 and 47 back to the battery. But one screw connection 34 has been shown and described it being understood that any desired number may be used to secure the cover in position on the base.

It is also to be understood that the wires 46 and 47 may constitute a portion of the ignition system of the engine.

Having thus described the invention what I claim is:

In a device of the class described an ignition circuit; a main source of energy and an ignition switch for said circuit; a normally open alarm circuit including said main source of energy, an electromagnetically operated switch comprising a coil, and a signal; a circuit including said main source of energy, said ignition switch, a manually operated switch and the coil of said electromagnetically operated switch, so that when said manually operated switch is closed and the ignition switch is closed, said circuit will be energized to operate the electromagnetically operated switch and close the alarm circuit; an auxiliary alarm circuit including said signal, an auxiliary source of energy, a manually operated switch and a second electromagnetically operated switch comprising a coil for holding said electromagnetically operated switch open when energized; a circuit including said main source of energy, said second-named electromagnetically operated switch coil and a manually operated switch, so that when said last named manually operated switch is closed. the second-named electromagnetically operated switch will hold the auxiliary alarm circuit open and permit it to close when said main source of energy is cut off; and lock-controlled means for operating all of said manually operated switches.

In testimony that I claim the foregoing as my own, I have hereto affixed my signature in the presence of two witnesses.

JOHN L. CROSSER.

Witnesses:
  GENE COVINGTON,
  SAMUEL A. HART.